(12) United States Patent
Justak

(10) Patent No.: US 8,322,234 B2
(45) Date of Patent: Dec. 4, 2012

(54) METHOD AND APPARATUS FOR MEASURING LIQUID QUANTITY IN BULK CONTAINERS

(75) Inventor: John F. Justak, Stuart, FL (US)

(73) Assignee: Advanced Technologies Group, Inc., Stuart, FL (US)

( * ) Notice: Subject to any disclaimer, the term of this patent is extended or adjusted under 35 U.S.C. 154(b) by 513 days.

(21) Appl. No.: 12/608,292

(22) Filed: Oct. 29, 2009

(65) Prior Publication Data

US 2011/0100119 A1  May 5, 2011

(51) Int. Cl.
*G01G 19/00* (2006.01)
(52) U.S. Cl. .......................................... 73/865; 73/296
(58) Field of Classification Search .................... 73/865, 73/296
See application file for complete search history.

(56) References Cited

U.S. PATENT DOCUMENTS

| | | | | |
|---|---|---|---|---|
| 5,555,764 A * | 9/1996 | Dybas | ............................. | 73/296 |
| 6,021,863 A * | 2/2000 | Stanley | .......................... | 180/273 |
| 7,290,568 B2 * | 11/2007 | Jeong | ............................. | 138/156 |
| 7,385,520 B2 * | 6/2008 | Patterson et al. | ............. | 340/667 |

\* cited by examiner

*Primary Examiner* — Hezron E Williams
*Assistant Examiner* — Paul West
(74) *Attorney, Agent, or Firm* — GrayRobinson, P.A.

(57) ABSTRACT

A method and apparatus for measuring the mass of liquid within collapsible, bulk fabric storage containers is provided wherein a deflection member arranged in a grid pattern supports the container and undergoes deflection creating an increase in the pressure of fluid within its interior which may be measured and correlated to the mass of the liquid within the container.

9 Claims, 5 Drawing Sheets

METHOD AND APPARATUS FOR MEASURING LIQUID QUANTITY IN BULK CONTAINERS

FIELD OF THE INVENTION

This invention relates to a method and apparatus for measuring the liquid quantity in bulk containers, and, more particularly, to one or more deflection members arranged in a grid pattern which supports the bulk container and produces a pressure measurement that may be correlated to the mass of liquid within the container.

BACKGROUND OF THE INVENTION

On the battlefield, the armed forces rely heavily on collapsible fabric storage containers for temporary storage of fuel and water. These bulk containers range in size from 3000 gallons to 210,000 gallons, and because they are made of fabric such containers assume different size and shape depending on the amount of liquid in their interior. Bulk fabric tanks of this type pose several technical difficulties in accounting for the volume of fuel and water used by the armed forces, due to problems in accurately measuring volume in a container of variable size and shape.

The current method for tracking the volume of fuel or water in bulk fabric storage containers is to measure the liquid as the container is filled or emptied using flow meters. One limitation of flow meters is that they are relatively inaccurate. It has been found that volume measurements taken on the contents of existing bulk fabric storage containers by flow meters may vary as much as 6% to 10%, plus or minus, compared to actual volume. This assumes that the flow meters are reset on a daily basis. If the flow meters are not reset, the accuracy is even worse due to cumulative error.

Another issue with bulk fabric storage containers is that even if current measurement techniques were capable of accurately determining volume levels during filling and/or emptying, the walls of such containers are semi-permeable and liquid can be lost through the walls via diffusion. Losses also occur through the venting system of the container. Consequently, volume measurements depending on flow meters are subject to further inaccuracies as liquid is pumped in or out of the container during use.

SUMMARY OF THE INVENTION

This invention is directed to a method and apparatus for measuring the mass of liquid within collapsible, bulk fabric storage containers wherein a deflection member arranged in a grid pattern undergoes deflection in response to the application of a load creating an increase in the pressure of fluid within its interior which is measured and correlated to the mass of the load.

In one presently preferred embodiment of this invention, the deflection member comprises at least one flexible line arranged in a grid pattern on which a container is positioned. The flexible line(s) has a hollow interior filled with a fluid, e.g. liquid or gas. The cross sectional area of the flexible line(s) decreases under the application of a load, e.g. as a container thereon is filled with liquid, and this results in an increase in the pressure of the fluid within the line(s). A pressure measurement device, such as a digital pressure gauge, is coupled to the line(s) and produces a measurement of the fluid pressure therein that may be correlated to the mass of the liquid within the container. A temperature sensor may also be coupled to the line(s) of the grid pattern to account for the effects of temperature change of the fluid in the line(s) on the pressure measurement.

The cross sectional area of the line(s) varies with the mass of the liquid within the container, and the pressure of the fluid within the line(s) changes accordingly. Because the container rests upon the grid pattern formed by the flexible line(s), changes in the size and shape of the container as it is filled and emptied do not affect the accuracy of the pressure measurements taken by the pressure measurement device.

The at least one flexible line noted above may comprise a single flexible line oriented in a zig-zag or other grid pattern having a dimension to accommodate the size of the container, or, alternatively, a number of flexible lines may be arranged in a grid pattern and connected to one another or to one or more common lines which are coupled to one or more pressure measurement devices and a temperature sensor. The flexible line(s) may be secured in a grid pattern on a mat for ease of deployment and transport, or merely connected to one another and placed directly on a surface beneath a container. The flexible lines may be commercially available fabric-covered, flexible fire hoses, typically having a core formed of resilient elastomeric material surrounded by a fiber jacket made of polyester or similar materials.

In an alternative embodiment of this invention, the deflection member comprises a number of discrete pressure pads arranged in a grid pattern and connected to one another by substantially inflexible hoses or other conduits. Each pressure pad, and the non-flexible hoses connecting them, is filled with a fluid. The cross sectional area of the pressure pads decreases under the application of a load which results in an overall increase in pressure within the grid pattern, as sensed by a pressure measurement device connected thereto.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
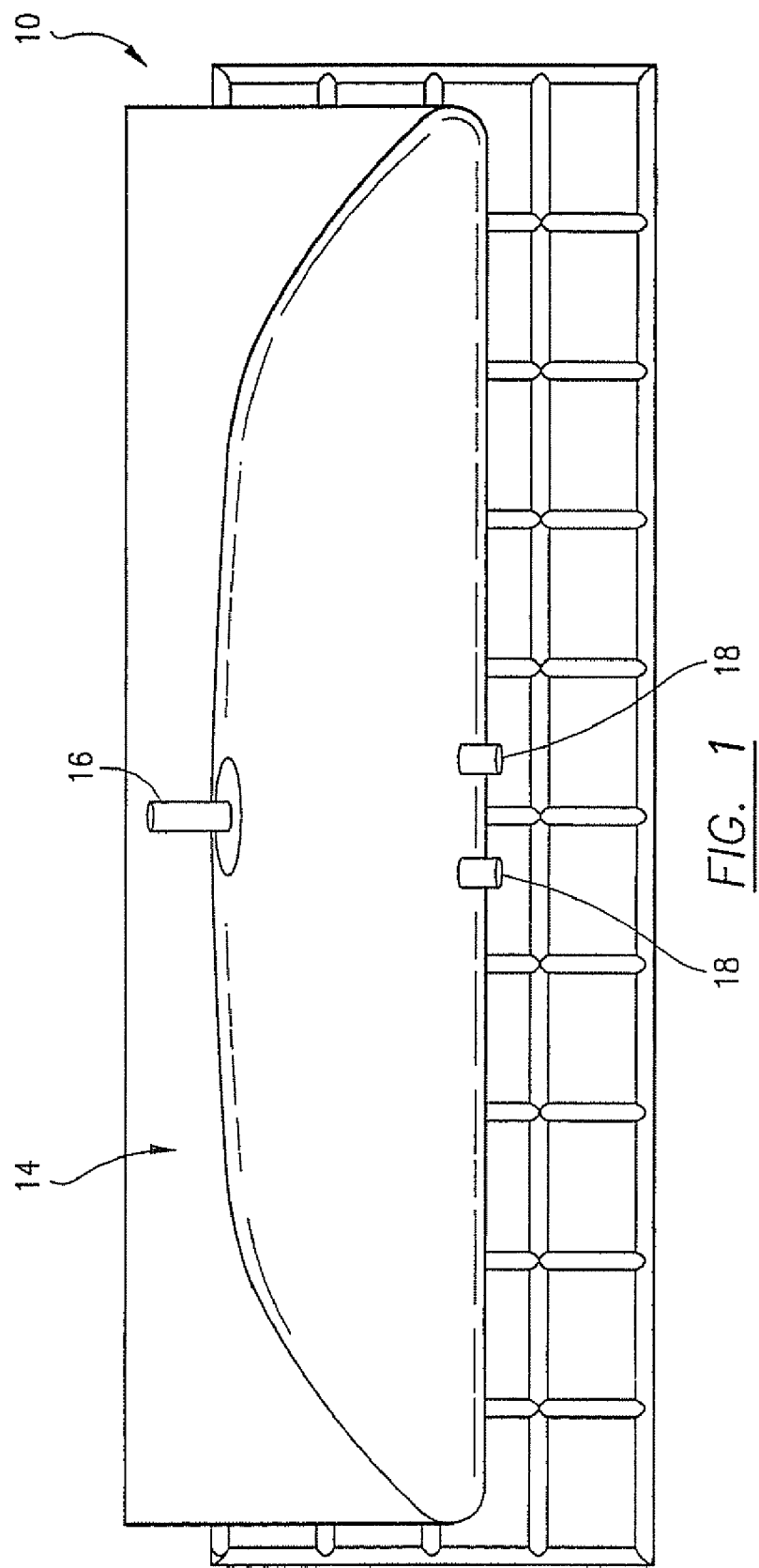
FIG. 1 is schematic, elevational view of a grid pattern of flexible lines according to one embodiment of this invention supporting a collapsible, bulk fabric storage container.

Referring initially to FIG. 1-7, one embodiment of a measuring apparatus 10 according to this invention is illustrated. As schematically depicted in FIG. 1, the apparatus 10 may support a collapsible, bulk fabric storage container 14 of the type currently utilized by the armed forces for storing fuel, water and other liquids. The container 14 includes an inlet 16 for filling it with liquid, and one or more outlets 18 for emptying the liquid. As noted above, the container 14 may be formed of a fabric material which assumes an irregular shape and size depending upon the amount of liquid within its interior.

The apparatus 10 may be configured in a variety of grid patterns, each of which comprises a deflection member in the form of one or more flexible lines 20. In the presently preferred embodiment, and as best viewed in FIGS. 2 and 3, each flexible line 20 may have the construction of a fire hose or similar conduit with a core or inner layer 22 defining a hollow interior 24 and an outer layer 26 encircling the inner layer 22. The inner layer 22 may be formed of an elastomeric material, such as thermoplastic polyurethane elastomer, or any other suitable material that is resistant to puncture and tearing and is capable of undergoing deflection in response to the application of a load but then returning to its original shape. The outer layer 26 may be formed of any suitable abrasion and puncture resistant material, such as polyester. The hollow interior 24 of the flexible line 20 is filled with a fluid, e.g. an incompressible liquid or a compressible gas such as air.

Various types of commercially available fire hoses are suitable for use as a flexible line 20 in the apparatus 10 of this invention. Fire hoses intended to transport water from a pumper to the hose nozzle may have a nominal inside diameter of 38 mm to 76 mm and operate at pressures up to about 2,760 kPa. Supply and relay hoses are typically larger in diameter, e.g. from 89 mm to 127 mm nominal inside diameter, and operate at pressures up to about 2,070 kPa. Forestry hoses are smaller, in the range of 25 mm to 38 mm nominal inside diameter, and operate at pressures up to about 3,105 kPa. It is contemplated that the flexible lines 20 may also be constructed of the material used to fabricate the bulk container 14.

Figure 4:
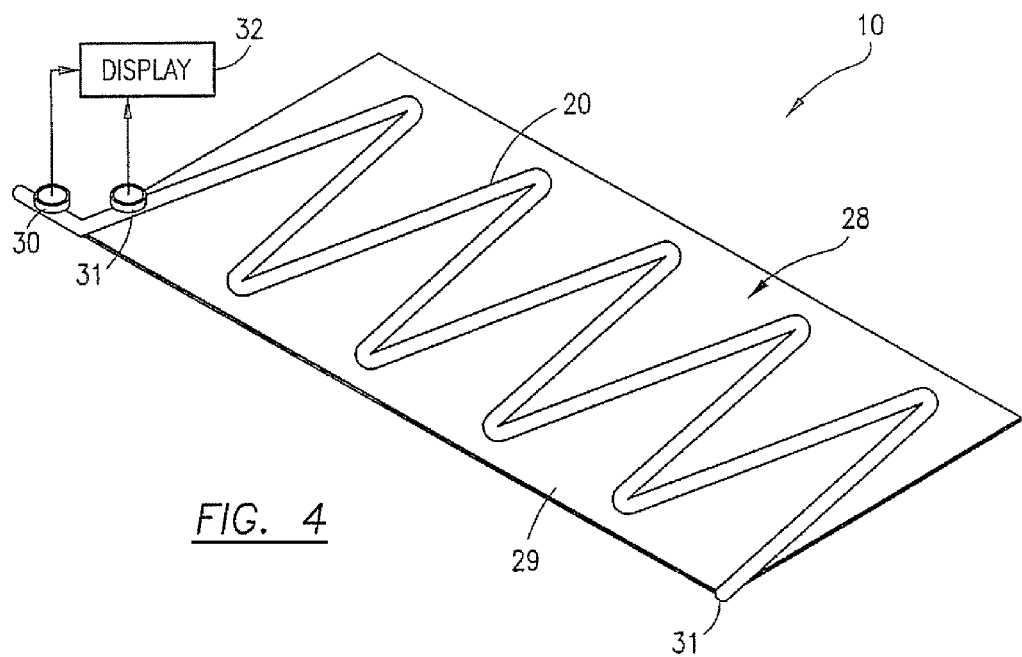
FIG. 4 is a perspective view of one embodiment of a single flexible line arranged in a grid pattern and secured to a mat wherein one end of the line is connected to a digital pressure gauge.

As noted above, the apparatus 10 may be configured in a number of grid patterns. Referring to FIG. 4, a single flexible line 20 is arranged in a zig-zag grid pattern 28 and affixed to a mat 29 to maintain its shape. The mat 29 may be formed of a flexible material so that the apparatus 10 as depicted in FIG. 4 may be rolled up for ease of transport. One end of the flexible line 20 in grid pattern 28 is closed and the other is coupled to a pressure measurement device 30. One suitable pressure measurement device 30 may be a digital pressure gauge. Additionally, a temperature sensor 31 may be connected to the flexible line 20. Both the pressure measurement device 30 and the temperature sensor 31 may be connected to a display 32, described more fully below in connection with a discussion of the operation of apparatus 10.

Figure 7:
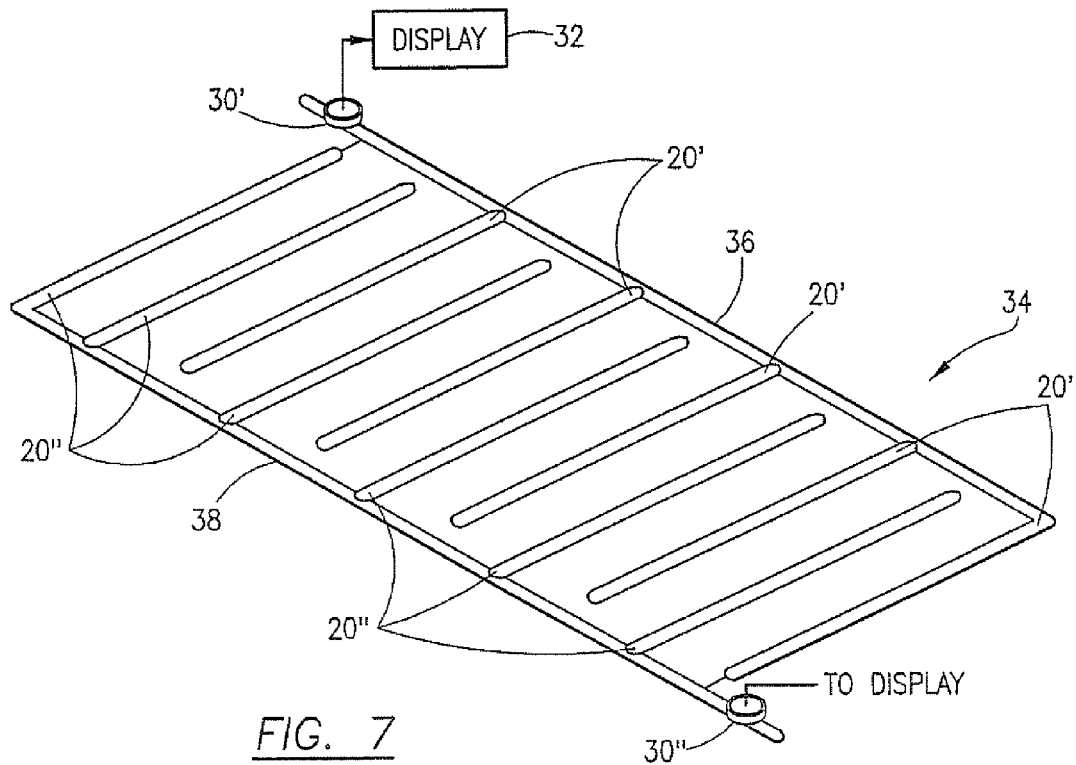
FIG. 7 is a perspective view of a first group of flexible lines connected to a first common line coupled to a digital pressure gauge, and a second group of flexible lines connected to a second common line coupled to another digital pressure gauge.

The embodiment of apparatus 10 shown in FIG. 7 employs a grid pattern 34 comprising a number of first flexible lines 20' each connected to a first common line 36, and a number of second flexible lines 20" each connected to a second common line 38. One end of the common line 36 is closed and the other end is connected to a pressure measurement device 30'. Similarly, one end of the common line 38 is closed and the other end is connected to a pressure measurement device 30". Each of the pressure measurement devices 30' and 30" 38 is connected to a display 32, which also connects to a temperature sensor (not shown) as in FIG. 4.

Figure 5:
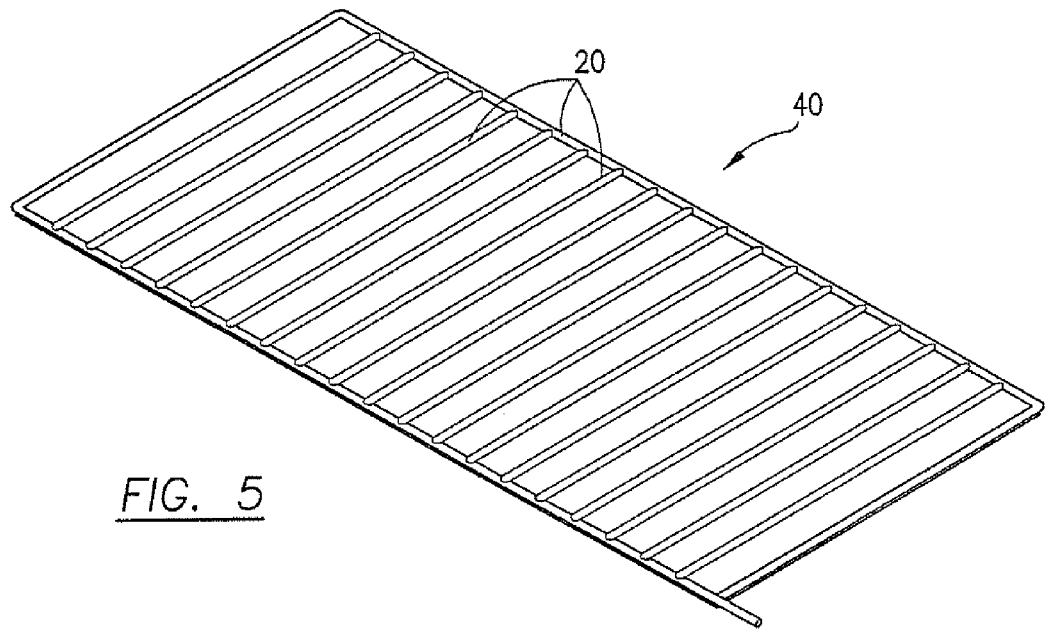
FIG. 5 is a perspective view of an alternative embodiment of a grid pattern comprising a number of flexible lines.
Figure 6:
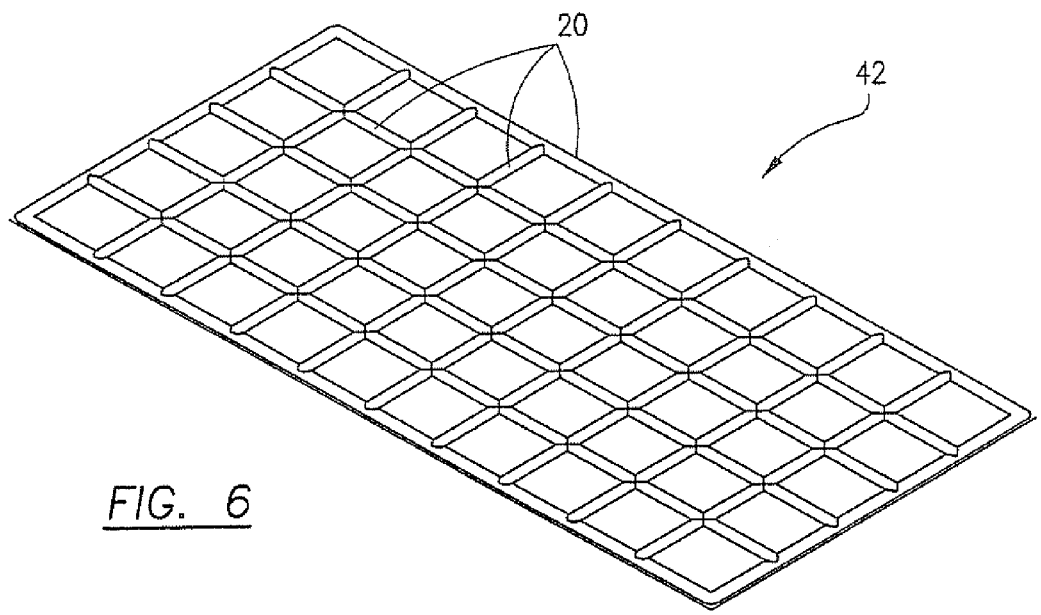
FIG. 6 is a perspective view of another embodiment of a grid pattern comprising a number of flexible lines.

The embodiment of this invention illustrated in FIG. 5 depicts an alternative grid pattern 40, and FIG. 6 shows still another grid pattern 42 which also appears in FIG. 1. The grid patterns 40, 42 of these embodiments each comprise a number of flexible lines 20 arranged in parallel columns (FIG. 5), or intersecting columns and rows (FIG. 6). The hollow interiors 24 of some or all of the flexible lines 20 in such grid patterns 40, 42 may communicate with one another and connect to one or more pressure measurement devices 30 and a temperature sensor 31 (not shown in FIGS. 5 and 6).

Figures 2, 3:
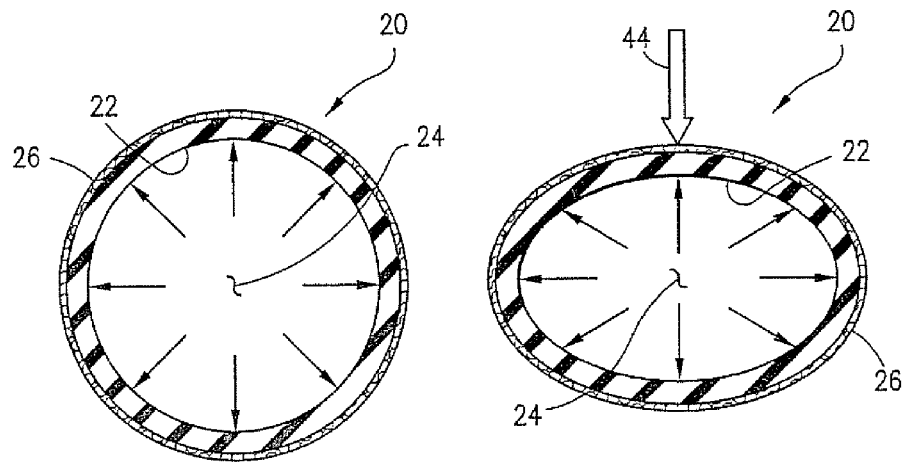
FIG. 2 is a cross sectional view of a flexible line, in an unloaded condition, having a first cross sectional area.
FIG. 3 is a cross sectional view similar to FIG. 2, except with the flexible line under load and having a second cross sectional area.

The operation of the measuring apparatus 10 illustrated in FIGS. 1-7 of this invention is predicated on the concept that changes in the cross sectional area of the flexible line(s) 20 in response to the application of a load create changes in the pressure of the fluid within the hollow interior 24 thereof which may be sensed by the pressure measurement devices 30, 30' and 30". As schematically depicted in FIG. 2, a flexible line 20 having a generally circular shape when unloaded may assume a generally oval shape under the application of a load represented by arrow 44 in FIG. 3. The cross sectional area of the circular-shaped flexible line 20 in FIG. 2 is greater than that of the oval-shaped flexible line 20 in FIG. 3, although both have the same perimeter dimension. As the cross sectional area of flexible line 20 decreases, the pressure of the fluid within its hollow interior 24 increases. This increase in pressure is conceptually based on the ideal gas law, $PV=nRT$, where P is the absolute pressure of the gas, V is the volume of the gas, n is the amount of substance in the gas, R is the gas constant and T is the absolute temperature. According to the ideal gas law, if temperature T is held constant, a decrease in volume results in an increase in pressure. As a practical matter, temperature of the fluid within the flexible line(s) 20 varies according to the weather conditions in which the container 14 is located. Consequently, a temperature sensor 31 is provided with each of the grid patterns 28, 34, 40 and 42 described above to compensate for the pressure change of the fluid within the flexible line(s) 20 due to changes in temperature.

It is contemplated that a number of different means may be employed to correlate the fluid pressure within the hollow interior 24 of flexible lines 20 with the mass of liquid within the container 14. One method of correlating fluid pressure to liquid mass may be to calibrate a particular grid pattern 28, 34, 40 or 42 at different temperatures within a range of average temperature for the area in which the apparatus 10 may be used. The calibration procedure may proceed as follows. Assuming a container 14 to be used with the apparatus 10 has a known mass when empty and a known mass when full of a particular liquid, e.g. fuel, water etc., readings from the pressure measurement device(s) 30, 30' or 30" coupled to the flexible tube(s) 20 of such grid patterns 28, 34, 40 or 42 may be obtained from the application of weights thereto equal to the mass of the container 14 when it is empty, equal to the mass of the container 14 when it is full of liquid, and, equal to the mass of the container 14 at each of a desired number of increments in between empty and full. In this manner, each reading obtained from the pressure measurement device 30 may be calibrated to a known mass applied to the flexible line(s) 20 in a particular grid pattern 28, 34, 40 or 42, at a known temperature.

For purposes of illustration, an empty container 14 placed on a flexible line 20 within a grid pattern 28, 34, 40 or 42 may result in no deflection or reduction in cross sectional area of such line 20, as shown in FIG. 2, but when filled the container 14 may cause the flexible line 20 to reduce in cross sectional area as depicted in FIG. 3. As the container 14 is emptied from a filled condition, the cross sectional area of the flexible line 20 increases from that shown in FIG. 3 to that illustrated in FIG. 2. The pressure of the fluid within the hollow interior 24 of the flexible tube 20, in turn, corresponds to its cross sectional area between the unloaded and fully loaded extremes depicted in FIGS. 2 and 3. The different pressure readings provided by the pressure measurement devices 30, 30' and 30" may be correlated to the values obtained during the calibration process described above to provide an accurate indication of the mass of the liquid in the container 14 at any point between empty and full for a given temperature. The pressure measurement device 30 and the temperature sensor 31 may be connected to a display 32 having a processor or other memory device. The display 32 may compare the reading or signal received from the pressure measurement device 30 and the reading or signal from the temperature sensor 31, to the data obtained from the calibration procedure described above and provide a digital display of the mass of the liquid within the container 14 corresponding to the sensed pressure at a sensed temperature.

Alternatively, it is contemplated that an algorithm may be employed to directly convert readings from the pressure measurement devices 30, 30' and 30" to a digital display of the mass of liquid within a container 14, accounting for the temperature of the fluid within the line(s) 20 in the area the container 14 is located as sensed by the temperature sensor 31. The algorithm may be contained within a processor associated with the display 32.

Figure 8:
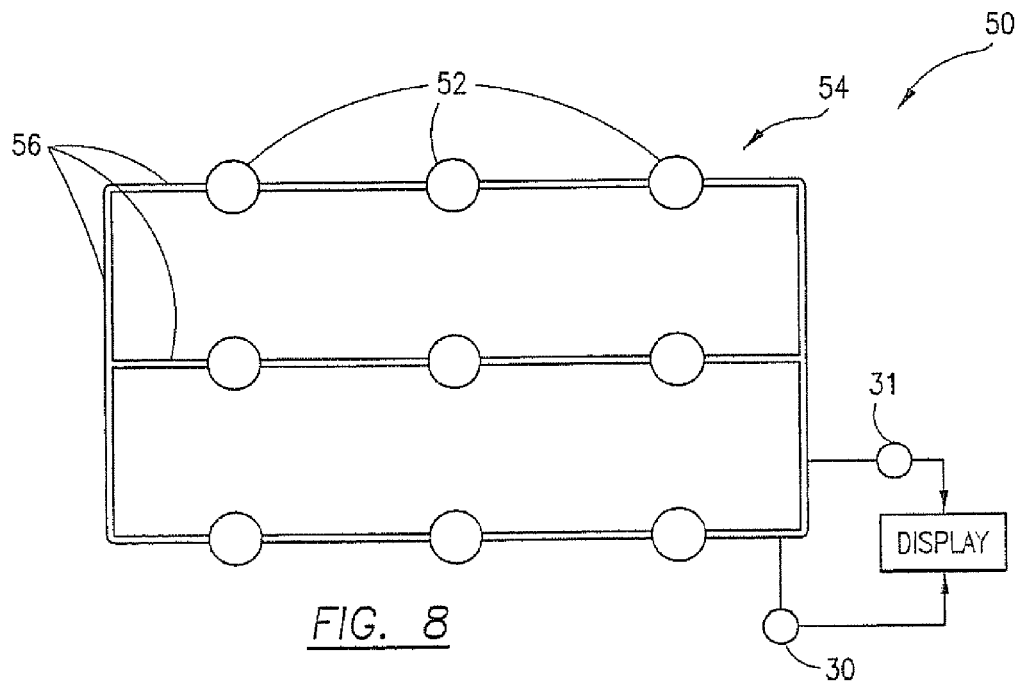
FIG. 8 is a perspective view of an alternative embodiment of this invention in which a number of pressure pads arranged in a grid pattern are connected to one another by substantially inflexible hoses or other conduits.
Figure 9:
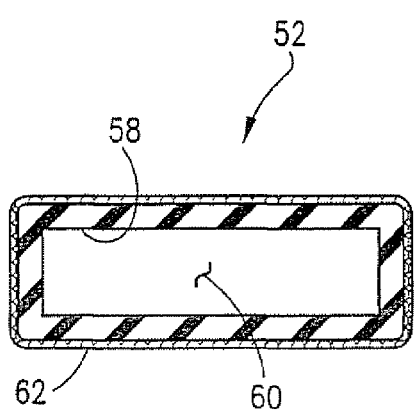
FIG. 9 is a cross sectional view of a pressure pad depicted in FIG. 8, in an unloaded condition, having a first cross sectional area.
Figure 10:
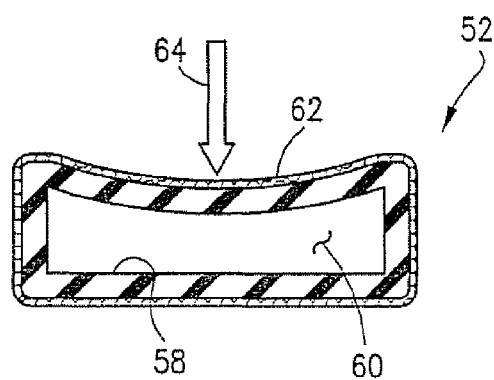
FIG. 10 is a cross sectional view similar to FIG. 9, except with the pressure pad under load and having a second cross sectional area.

Referring now to FIGS. 8-10, an alternative embodiment of a measuring apparatus 50 according to this invention is illustrated. The apparatus 50 comprises a number of discrete pressure pads 52 arranged in a grid pattern 54 and connected by lines 56 which are substantially inflexible under the application of a load applied by the container 14 when completely filled. The pressure pads 52 are preferably generally disc-shaped, although other shapes may be utilized, with a core or inner layer 58 defining a hollow interior 60 and an outer layer 62 encircling the inner layer 58. The hollow interior 60 of pressure pads 52 and lines 56 are filled within a fluid such as a liquid or air. Such layers 58 and 62 may be formed of the same materials as the flexible line(s) 20 described above in connection with a discussion of FIGS. 1-7.

The pressure pads 52 behave in essentially the same fashion as flexible line(s) 20 under the application of a load. A pressure pad 52 having the cross-sectional shape depicted in FIG. 9 when unloaded may assume the shape illustrated in FIG. 10 under the application of a load represented by arrow 64 in FIG. 10. The cross sectional area of the pressure pad 52 in FIG. 9 is greater than that of the pressure pad 52 in FIG. 10, although both have the same perimeter dimension. As the cross sectional area of pressure pad 52 decreases, the pressure of the fluid within its hollow interior 60 increases. The pressure within the grid pattern 54 may be sensed by a pressure measurement device 30, and the temperature of the fluid within the pressure pads 52 and lines 56 may be determined by a temperature sensor 31. Both the pressure measurement device 30 and the temperature sensor 31 are preferably coupled to a display 32. Further, the measuring apparatus 50 is calibrated, and operates in the same fashion, as the measuring apparatus 10 described above.

Among the advantages of the measuring apparatus 10 and the measuring apparatus 50 of this invention is that they are capable of providing accurate readings of the mass of liquid within a container 14 that is flexible and varies in size and dimension as it transitions between an empty and filled state. So long as the overall dimension of the grid patterns 28, 34, 40, 42 and 54 are at least equal to the dimension of the container 14 when full, a decrease in the size of the container 14 does not affect the pressure measurements needed to obtain an indication of the mass of liquid within the container 14, as described above. The container 14 may even extend in between adjacent flexible lines 20 within a grid pattern 28, 34, 40 or 42, or between pressure pads 52 within the grid pattern 54, and touch the surface beneath, without impairing the accuracy of pressure readings. Further, the measuring apparatus 10 and the measuring apparatus 50 are light weight, portable and relatively inexpensive to manufacture or repair.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, while only the grid pattern 28 depicted in FIG. 4 is illustrated with a mat 29 connected to a flexible line 20 it is contemplated that any or all of the other grid patterns 34, 40, 42 and 54 could employ a mat 29. Further, the grid patterns 28, 34, 40, 42 and 54 are depicted for purposes of illustration only and other arrangements of one or more flexible lines 20, or pressure pads 52, in different grid patterns are considered within the scope of this invention.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for measuring the mass of a liquid, comprising:
   a bulk fabric storage container having an expanded size when filled with the liquid and a smaller, collapsed size when empty;
   at least one deflection member arranged in a grid pattern upon which said bulk fabric storage container is positioned, said grid pattern having a size at least equal to said expanded size of said bulk fabric storage container, said at least one deflection member having a hollow interior filled with a fluid, said at least one deflection member being movable between a first position in which said hollow interior has a first cross sectional area and said bulk fabric storage container is empty, and a second position in which said hollow interior has a second cross sectional area and said bulk fabric storage container is full, said second cross sectional area being less than said first cross sectional area, said at least one deflection member being effective to assume any cross sectional area between said first and second cross sectional areas in response to variations in the mass of the liquid within said bulk fabric storage container;
   at least one pressure measurement device coupled to said at least one deflection member, said at least one pressure measurement device being effective to sense the pressure of said fluid within said hollow interior of said at least one deflection member with said bulk fabric storage container resting on said grid pattern and while the size of said bulk fabric storage container varies between said expanded size and said collapsed size as liquid is introduced into or removed from said bulk fabric storage container, the pressure sensed by said at least one pressure measurement device varying in relation to said cross sectional area of said at least one deflection member, said at least one pressure measurement device producing a measurement of said pressure that may be correlated to the mass of the liquid within said bulk fabric storage container.

2. The measuring apparatus of claim 1 in which said at least one deflection member comprises at least one flexible line.

3. The measuring apparatus of claim 2 in which said at least one flexible line comprises a number of flexible lines each having a hollow interior which communicate with one another.

4. The measuring apparatus of claim 2 in which said at last one flexible line is a fabric-covered flexible hose.

5. The measuring apparatus of claim 2 in which said at least one flexible line arranged in a grid pattern is affixed to a mat.

6. The measuring apparatus of claim 1 further including a temperature sensor coupled to said at least one deflection member, said temperature sensor being effective to sense the temperature of the fluid within said hollow interior of said at least one deflection member.

7. A method of measuring the mass of a liquid, comprising:
  (a) providing a bulk fabric storage container having an expanded size when filled with the liquid and a smaller, collapsed size when empty;
  (b) providing at least one deflection member arranged in a grid pattern having a size at least equal to said expanded size of said bulk fabric storage container, said at least one deflection member having a hollow interior filled with a fluid;
  (c) placing the bulk fabric storage container onto said grid pattern of said at least one deflection member, said at least one deflection member being movable from between a first position in which said hollow interior has a first cross sectional area and wherein said bulk fabric storage container is filled with liquid, and a second position in which said hollow interior has a second cross sectional area and wherein said bulk fabric storage container is empty;
  (d) sensing the pressure of the fluid within said hollow interior of said at least one deflection member while said bulk fabric storage container varies in size between said expanded size and said collapsed size as liquid is introduced into or removed from said bulk fabric storage container, said pressure varying in relation to said cross sectional area of said hollow interior of said at least one deflection member;
  (e) correlating the pressure sensed in step (d) to the mass of the liquid within said bulk fabric storage container.

8. The method of claim 7 in which step (b) comprises providing at least one flexible line having a hollow interior.

9. The method of claim 7 further including:
  (f) sensing the temperature of the fluid within said hollow interior of said at least one deflection member;
  (g) adjusting the magnitude of the pressure sensed in step (d) in relation to the temperature sensed in step (f); and
  (h) correlating the magnitude of the pressure as adjusted in step (g) to the mass of the liquid within the bulk container.

* * * * *